(12) United States Patent
Kuramoto et al.

(10) Patent No.: US 8,040,222 B2
(45) Date of Patent: Oct. 18, 2011

(54) RADIO-FREQUENCY TAG COMMUNICATION SYSTEM

(75) Inventors: Katsuyuki Kuramoto, Chigasaki (JP); Shiro Yamada, Kasugai (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 917 days.

(21) Appl. No.: 11/938,741

(22) Filed: Nov. 12, 2007
(Under 37 CFR 1.47)

(65) Prior Publication Data
US 2008/0278291 A1   Nov. 13, 2008

Related U.S. Application Data

(63) Continuation-in-part of application No. PCT/JP2006/307253, filed on Apr. 5, 2006.

(51) Int. Cl.
*H04Q 5/22* (2006.01)
*G08B 13/14* (2006.01)
*G01S 13/00* (2006.01)
*H01Q 3/00* (2006.01)

(52) U.S. Cl. ............... 340/10.1; 340/10.4; 340/572.4; 340/572.7; 342/147; 342/155; 343/757

(58) Field of Classification Search .......... None
See application file for complete search history.

(56) References Cited

U.S. PATENT DOCUMENTS

| | | | |
|---|---|---|---|
| 5,963,130 A * | 10/1999 | Schlager et al. | 340/540 |
| 6,097,301 A * | 8/2000 | Tuttle | 340/693.9 |
| 6,396,413 B2 * | 5/2002 | Hines et al. | 340/8.1 |
| 6,456,239 B1 * | 9/2002 | Werb et al. | 342/463 |
| 6,473,055 B2 | 10/2002 | Kohno et al. | |
| 6,566,997 B1 * | 5/2003 | Bradin | 340/10.2 |
| 6,600,418 B2 * | 7/2003 | Francis et al. | 340/572.1 |
| 6,727,816 B1 * | 4/2004 | Helgeson | 340/540 |
| 6,750,771 B1 * | 6/2004 | Brand | 340/572.7 |

(Continued)

FOREIGN PATENT DOCUMENTS

JP   S57-082705 U   5/1982

(Continued)

OTHER PUBLICATIONS

International Search Report for PCT/JP2006/307253, mailed Jun. 27, 2006.

(Continued)

*Primary Examiner* — George Bugg
*Assistant Examiner* — Renee Dorsey
(74) *Attorney, Agent, or Firm* — Baker Botts L.L.P.

(57) ABSTRACT

A radio-frequency tag communication system including (a) a radio-frequency tag, (b) a radio-frequency tag communication device configured to transmit a transmitted signal toward the radio-frequency tag, and to receive a reply signal transmitted from the radio-frequency tag in response to the transmitted signal, for thereby effecting radio communication with the radio-frequency tag, and (c) at least one reference tag disposed fixedly in an area of communication of the radio-frequency tag communication system and configured to transmit a reply signal in response to the transmitted signal, for thereby effecting radio communication with the radio-frequency tag communication device, and wherein the radio-frequency tag communication device includes a directivity control portion configured to control a directivity of communication with the radio-frequency tag, on the basis of a result of the radio communication of the radio-frequency tag communication device with the at least one reference tag.

12 Claims, 12 Drawing Sheets

U.S. PATENT DOCUMENTS

| | | | |
|---|---|---|---|
| 7,116,988 B2 * | 10/2006 | Dietrich et al. | 455/456.1 |
| 7,148,803 B2 * | 12/2006 | Bandy et al. | 340/539.16 |
| 2002/0126013 A1 * | 9/2002 | Bridgelall | 340/572.1 |
| 2004/0027243 A1 * | 2/2004 | Carrender | 340/568.1 |
| 2005/0052281 A1 * | 3/2005 | Bann | 340/539.13 |
| 2005/0099302 A1 | 5/2005 | Lieffort et al. | |
| 2006/0014497 A1 | 1/2006 | Doi et al. | |
| 2006/0022884 A1 * | 2/2006 | Hayashi et al. | 343/757 |
| 2006/0056370 A1 * | 3/2006 | Hancock et al. | 370/338 |

FOREIGN PATENT DOCUMENTS

| | | |
|---|---|---|
| JP | H06-017403 Y2 | 5/1994 |
| JP | H10-091791 A | 4/1998 |
| JP | 2000-357251 A | 12/2000 |
| JP | 2001-116583 A | 4/2001 |
| JP | 2001-298389 A | 10/2001 |
| JP | 2002-185393 A | 6/2002 |
| JP | 2002-246931 A | 8/2002 |
| JP | 2005-056177 A | 3/2003 |
| JP | 2003-283411 A | 10/2003 |
| JP | 2004-038583 A | 2/2004 |
| JP | 2004-090099 A | 3/2004 |
| JP | 2004-094752 A | 3/2004 |
| JP | 2004-144542 A | 5/2004 |
| JP | 2004-175509 A | 6/2004 |
| JP | 3587444 B2 | 8/2004 |
| WO | W003/021875 A1 | 3/2003 |
| WO | W003/079672 A1 | 9/2003 |

OTHER PUBLICATIONS

Japan Patent Office; Office Action in Japanese Patent Application No. 2005-140822 (counterpart to the above-captioned U.S. patent application) mailed Jun. 30, 2009 (abbreviated translation).

Japan Electronic Information Communication Society, Antenna Engineering Handbook, pp. 226-228, Jul. 10, 1984 (concise explanation of relevance provided).

* cited by examiner

RADIO-FREQUENCY TAG COMMUNICATION SYSTEM

CROSS REFERENCE TO RELATED APPLICATION

The present application is a Continuation-in-Part of International Application No. PCT/JP2006/307253 filed on Apr. 5, 2006, which claims the benefits of Japanese Patent Application No. 2005-140822 filed on May 13, 2005; the disclosures of which are incorporated herein by reference.

BACKGROUND OF THE INVENTION

1. Field of the Invention

The present invention relates to improvements of a radio-frequency tag communication system including a radio-frequency tag communication device configured to effect radio communication with a radio-frequency tag, for writing and reading information on and from the radio-frequency tag.

2. Description of the Related Art

There is known a radio-frequency identification system (an RFID system) including small-sized radio-frequency tags (transponders) storing predetermined information, and a radio-frequency tag communication device (interrogator) arranged to read desired information from the radio-frequency tags in a non-contact fashion. The radio-frequency communication device of this RFID system is capable of reading out the information from the radio-frequency tags, by radio communication with the radio-frequency tags, even where the radio-frequency tags are soiled or located at invisible places. For this reason, the RFID system is expected to be used in various fields such as management and inspection of commodities.

In the field of such a radio-frequency tag communication device, there is known a technique for changing the directivity of communication of the radio-frequency tag communication device with a communication object in the form of the radio-frequency tag. JP-2003-283411A discloses an example of the radio-frequency tag communication device configured according to such a technique, which is provide with an array antenna device including a plurality of antenna elements, and an adaptive processing portion configured to multiply received signals received by the respective antenna elements, by respective weights. The adaptive processing portion configured to multiply the received signals by the adequate weights can suitably control the directivity of reception of the array antenna device, permitting adequate radio communication with the desired radio-frequency tag.

However, the prior art technique described above does not permit setting of an angular range of direction in which the directivity of communication is controlled, that is, does not permit setting of an effective range of communication. Accordingly, the direction of communication must be changed over an angular range unnecessarily wide as to cover a directional range in which the radio-frequency tag is unlikely to exist. Therefore, the prior art technique suffers from a drawback of requirements for an unnecessarily long time and an unnecessarily large amount of power consumption. Thus, there has been a need of developing a radio-frequency tag communication system wherein the radio-frequency tag communication device is capable of adequately setting its control range of directivity of communication.

SUMMARY OF THE INVENTION

The present invention was made in view of the background art described above. Accordingly, it is an object of the present invention to provide a radio-frequency tag communication system wherein the radio-frequency tag communication device is capable of adequately setting its control range of directivity of communication.

The object indicated above can be achieved according to the principle of the present invention, which provides a radio-frequency tag communication system comprising a radio-frequency tag, a radio-frequency tag communication device configured to transmit a transmitted signal toward the radio-frequency tag, and to receive a reply signal transmitted from the radio-frequency tag in response to the transmitted signal, for thereby effecting radio communication with the radio-frequency tag, and at least one reference tag disposed fixedly in an area of communication of the radio-frequency tag communication system and configured to transmit a reply signal in response to the transmitted signal, for thereby effecting radio communication with the radio-frequency tag communication device, and wherein the radio-frequency tag communication device includes a directivity control portion configured to control a directivity of communication with the radio-frequency tag, on the basis of a result of the radio communication of the radio-frequency tag communication device with the at least one reference tag.

In the radio-frequency tag communication system constructed as described above according to the present invention, the at least one reference tag configured to transmit the reply signal in response to the transmitted signal for thereby effecting the radio communication with the radio-frequency tag communication device is disposed fixedly in the area of communication of the radio-frequency tag communication system, and the radio-frequency tag communication device includes the directivity control portion configured to control the directivity of communication with the radio-frequency tag on the basis of the result of the radio communication of the radio-frequency tag communication device with the at least one reference tag. Accordingly, the control range of directivity of communication of the radio-frequency tag communication device can be set by effecting the radio communication with the at least one reference tag located at a predetermined position. Thus, the present invention provides the radio-frequency tag communication system wherein the radio-frequency tag communication device is capable of adequately setting its control range of directivity of communication.

In a first preferred form of this invention, the radio-frequency tag communication device further includes an effective-communication-range determining portion configured to determine an effective range of communication of the radio-frequency tag communication device with the radio-frequency tag, by detecting a position of each of the at least one reference tag while the directivity of communication is changed by the directivity control portion, and the directivity control portion controls the directivity of communication with the radio-frequency tag on the basis of a result of determination by the effective-communication-range determining portion. In this case, it is possible to determine a plurality of effective and ineffective ranges of communication relating to the directivity of communication, thereby permitting more adequate setting of the control range of directivity of communication.

In one advantageous arrangement of the first preferred form of the invention, the at least one reference tag consists of a plurality of reference tags disposed fixedly at respective edges defining the effective range of communication, and the effective-communication-range determining portion determines a range between the plurality of reference tags, as the effective range of communication. In this case, the control range of directivity of communication can be effectively controlled.

In another advantageous arrangement of the first preferred form of the invention, each of the at least one reference tag has a memory which stores boundary condition information indicative of a condition for determining the effective range of communication. In this case, the control range of directivity of communication can be effectively controlled by reading out the boundary condition information from the memory of each reference tag.

In a second preferred form of the invention, the radio-frequency tag communication device further includes a transmitted-signal-strength determining portion configured to determine a minimum strength of the transmitted signal, which minimum strength permits the radio communication of the radio-frequency tag communication device with the at least one reference tag. In this case, the amount of electric power required for the radio communication with the at least one reference tag can be minimized.

In one advantageous arrangement of the second preferred form of the invention, the transmitted-signal-strength determining portion is configured to determine a minimum strength of the transmitted signal, which minimum strength permits the radio communication of the radio-frequency tag communication device with the radio-frequency tag. In this case, the amount of electric power required for the radio communication with the radio-frequency tag can be minimized.

In another advantageous arrangement of the second preferred form of the invention, the radio-frequency tag communication device further includes a transmission-output changing portion configured to change the strength of the transmitted signal, and the transmitted-signal-strength determining portion commands the transmission-output changing portion to control the strength of the transmitted signal to be transmitted toward the radio-frequency tag and the at least one reference tag. In this case, the amount of electric power required for the radio communication with the radio-frequency tag and the at least one reference tag can be suitably controlled.

In a third preferred form of the present invention, the radio-frequency tag communication device further includes a memory portion for storing a result of the radio communication with the at least one reference tag. In this case, the control range of directivity of communication can be suitably set by reading out from the memory portion the result of the radio communication which is effected a required number of times with the at least one reference tag.

In one advantageous arrangement of the third preferred form of the invention, the radio-frequency tag communication device further includes an effective-communication-range determining portion configured to determine an effective range of communication of the radio-frequency tag communication device with the radio-frequency tag, by detecting a position of each of the at least one reference tag while the directivity of communication is changed by the directivity control portion, and the directivity control portion controls the directivity of communication with the radio-frequency tag on the basis of a result of determination by the effective-communication-range determining portion, the memory portion being configured to store the result of determination by the effective-communication-range determining portion. In this case, the control range of directivity of communication can be suitably set by reading out from the memory portion the result of the radio communication (the result of determination by the effective-communication-range determining portion) which is effected a required number of times with the at least one reference tag.

Where the at least one reference tag consists of a plurality of reference tags, the memory portion is preferably configured to store a plurality of results of determinations which are made by the effective-communication-range determining portion on the basis of information received from the respective reference tags. Where a plurality of areas of the effective range of communication are determined on the basis of the information received from the plurality of reference tags, the results of the determinations made by the effective-communication-range determining portion are stored in the memory portion. In this case, the control range of directivity of communication can be suitably set by reading out from the memory portion the results of the determinations by the effective-communication-range determining portion, each of which is effected a required number of times with the corresponding reference tag.

In another advantageous arrangement of the third preferred form of the invention, the radio-frequency tag communication device further includes a transmitted-signal-strength determining portion configured to determine a minimum strength of the transmitted signal, which minimum strength permits the radio communication of the radio-frequency tag communication device with the at least one reference tag, and the memory portion is configured to store a result of determination by the transmitted-signal-strength determining portion. In this case, the amount of electric power required for the present radio communication with the radio-frequency tag and the at least one reference tag can be minimized by reading out from the memory portion the result of the past determination by the transmitted-signal-strength determining portion In a fourth preferred form of this invention, the radio-frequency tag communication device further includes an array antenna device having a plurality of antenna elements. In this case, the directivity of communication of the radio-frequency tag communication device with the at least one reference tag and the radio-frequency tag can be effectively controlled.

In one advantageous arrangement of the fourth preferred form of the invention, the array antenna device has a plurality of circular polarization antenna units each of which consists of a pair of mutually intersecting rod-like antenna elements. In this case, the radio-frequency tag communication device can effect radio communication with the at least one reference tag and the radio-frequency tag, with high stability of sensitivity, by using circularly polarized waves, irrespective of the relative position between the array antenna device and the at least one reference tag and the radio-frequency tag.

BRIEF DESCRIPTION OF THE DRAWING

The above and other objects, features and industrial significance of this invention will be better understood by reading the following detailed description of preferred embodiments of the invention, when considered in connection with the accompanying drawings in which.

DETAILED DESCRIPTION OF THE PREFERRED EMBODIMENTS

The preferred embodiments of this invention will be described in detail by reference to the accompanying drawings.

Figure 1:
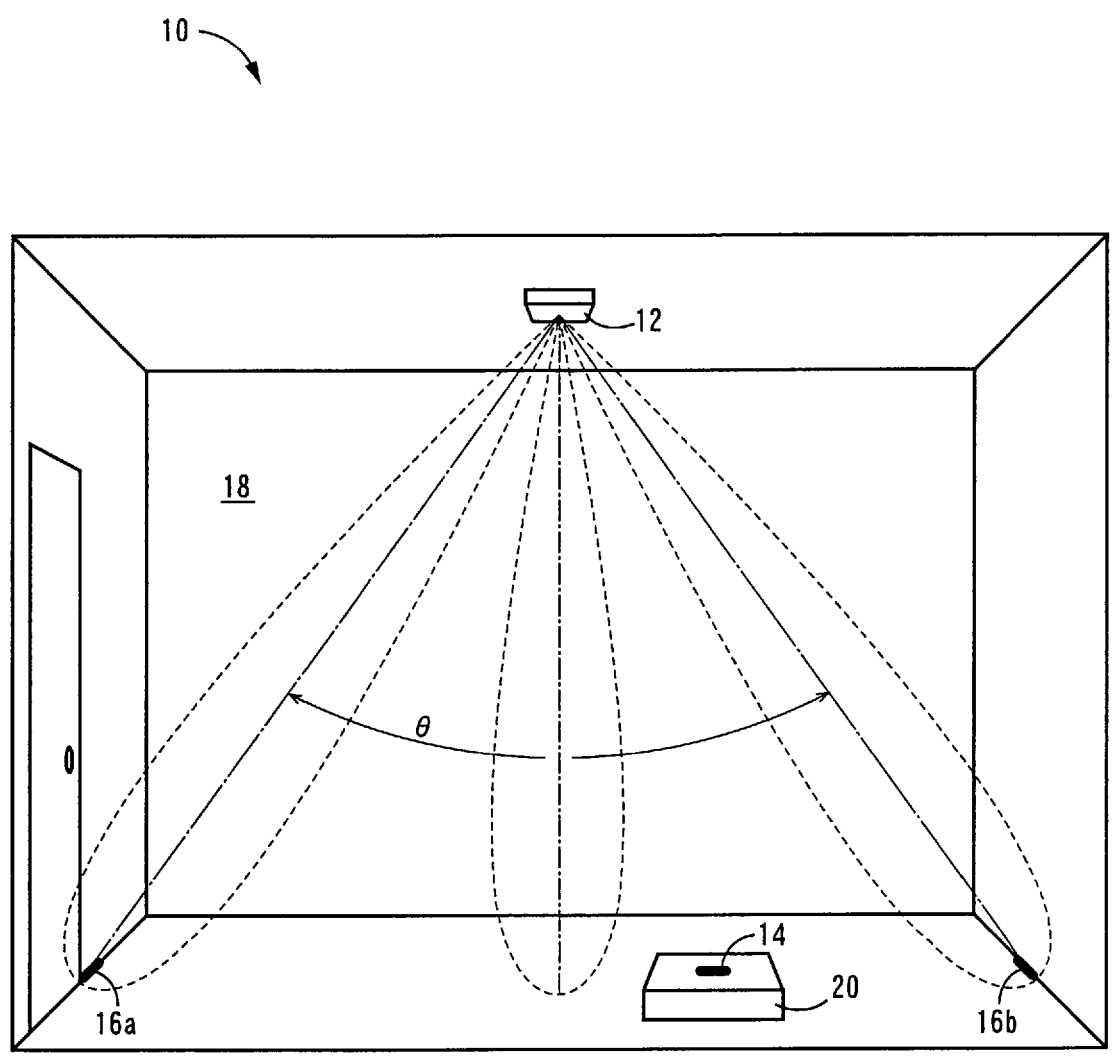
FIG. 1 is a view showing a communication system constructed according to a first embodiment of the present invention.

Referring first to FIG. 1, there is shown a radio-frequency tag communication system 10 constructed according to the first embodiment of this invention. This radio-frequency tag communication system 10 is a so-called RFID (radio-frequency identification) system including a radio-frequency tag communication device 12, and at least one (only one in the example of FIG. 1) communication object each in the form of a radio-frequency tag 14 with which the radio-frequency tag communication device 12 communicates. The radio-frequency tag communication device 12 functions as an interrogator of the RFID system 10, while each radio-frequency tag 14 functions as a transponder of the RFID system 10. Described in detail, the radio-frequency tag communication device 12 is configured to transmit an interrogating wave $F_c$ (transmitted signal) toward the radio-frequency tag 14, and the radio-frequency tag 14 which has received the interrogating wave $F_c$ modulates the received interrogating wave $F_c$ according to a desired information signal (desired data), and to transmit the modulated wave as a reply wave $F_r$ (reply signal) toward the radio-frequency tag communication device 12. Thus, radio communication is effected between the radio-frequency tag communication device 12 and the radio-frequency tag 14.

For example, the radio-frequency tag communication system 10 is a system wherein the radio-frequency tag communication device 12 is disposed fixedly on a ceiling 18c of a room 18, while the radio-frequency tag 14 is attached to an article 20 disposed or stored in the room 18. The radio-frequency tag 14 stores information relating to the article 20. The radio-frequency tag communication device 14 is provided to detect a movement of the article within or out of the room 18. The radio-frequency tag communication system 10 further includes at least one reference tag (two reference tags 16a, 16b in the example of FIG. 1, which are collectively referred to as "reference tags 16", unless otherwise specified) each disposed fixedly within a communication area in the form of the room 18. Like the radio-frequency tag 14, each reference radio-frequency tag 16 includes a radio-frequency tag circuit element 84 and is configured to transmit the reply wave $F_r$ in response to the interrogating wave $F_c$.

The reference tags 16 are provided to set reference point or boundaries for controlling the directivity of the radio-frequency tag communication device 14. As shown in FIG. 1, the reference tags 16 are fixed at respective opposite parallel edges of a floor of the room 18, which edges define an effective range of communication of the radio-frequency communication device 12. The radio-frequency tag communication device 12 is arranged to effect ratio communication with the reference tags 16 for determining the effective communication range, as descried below in detail by reference to the flow chart of FIG. 11, to control the directivity of communication with the radio-frequency tag 14, according to the determined effective communication range. Preferably, each reference tag 16 is arranged to store boundary condition information indicative of a condition for determining the effective communication range, in a memory portion 96 of the radio-frequency tag circuit element 84, and the radio-frequency tag communication device 12 is configured to read out the boundary condition information from the memory portion 96 of the reference tag 16, to determine the effective communication range. In this preferred arrangement, the reference tags 16 need not be disposed at the positions corresponding to the opposite ends of the effective communication range of the radio-frequency tag communication device 12.

Figure 2:
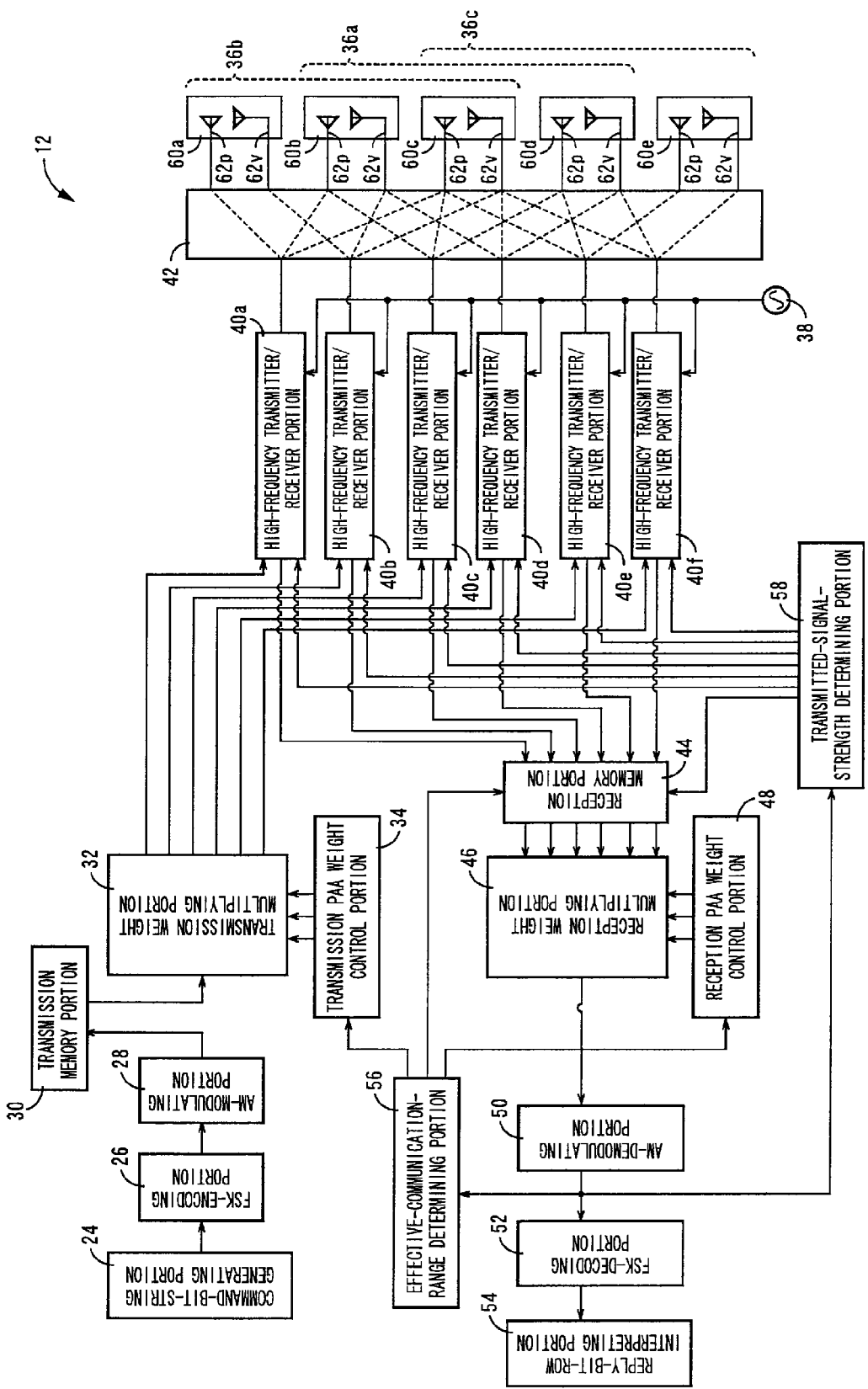
FIG. 2 is a block diagram showing an arrangement of a radio-frequency tag communication device of the radio-frequency tag communication system of FIG. 1.

Referring next to FIG. 2, there is shown an arrangement of the radio-frequency tag communication device 12. As shown in FIG. 2, the radio-frequency tag communication device 12 includes: a command-bit-string generating portion 24 configured to generate a string of command bits corresponding to the transmitted signal to be transmitted toward the radio-frequency tag 14; an FSK-encoding portion 26 configured to encode a digital signal received from the command-bit-string generating portion 24, according to an FSK-encoding method; an AM-modulating portion 28 configured to modulate the encoded signal received from the FSK-encoding portion 26, according to an AM method, and to apply (store) the modulated signal to (in) a transmission memory portion 30; a transmission PAA (phased array antenna) processing portion in the form of a transmission weight multiplying portion 32 configured to read out the modulated signal (transmitted signal) from the transmission memory portion 30 from time to time, and to multiply the read-out transmitted signals, by predetermined transmission weights (transmission PAA weights); and a transmission weight control portion 34 configured to determine or control the transmission weights used by the transmission weight multiplying portion 32.

The radio-frequency tag communication device 12 further includes: a plurality of (three in the example of FIG. 2) array antenna devices 36a, 36b and 36c (hereinafter collectively referred to as "array antenna devices 36", unless otherwise specified) configured to transmit the transmitted signal toward the radio-frequency tag 14, and to receive the reply signal transmitted from the radio-frequency tag 14 in response to the transmitted signal; a local-signal generating portion 38 configured to generate a predetermined local signal; a plurality of (six in the example of FIG. 2) high-frequency transmitter/receiver portions 40a, 40b, 40c, 40d, 40e and 40f (hereinafter collectively referred to as "high-frequency transmitter/receiver portions 40", unless otherwise specified) configured to increase the frequencies of the transmitted signals received from the transmission weight multiplying portion 32, according to the local signal received from the local-signal generating portion 38, and to reduce the frequencies of the received signals received by the array antenna devices 36, according to the local signal received from the local-signal generating portion 38; an antenna selector portion 42 configured to connect each of the high-frequency transmitter/receiver portions 40 to a selected one of the plurality of array antenna devices 36, to apply the output of each high-frequency transmitter/receiver portion 40 to the selected array antenna device 36, and to apply the received signal received by the selected array antenna device 36, to the high-frequency transmitter/receiver portion 40 in question; and a reception memory portion 44 configured to store the received signals.

The radio-frequency tag communication device 12 further includes: a reception weight multiplying portion 46 configured to read out the received signals from the reception memory portion 44, and to multiply the read-out received signals by predetermined reception weights (reception PAA weights), for obtaining a composite received signal; a reception weight control portion 48 configured to determine or control the reception weights used by the reception weight multiplying portion 46; an AM-demodulating portion 50 configured to demodulate the composite signal received from the reception weight multiplying portion 46, according to the AM method, for obtaining an AM-demodulated wave; an FSK-decoding portion 52 configured to decode the AM-demodulated wave received from the AM-demodulating portion 50, according to an FSK decoding method, for obtaining a decoded signal; a reply-bit-row interpreting portion 54 configured to interpret the decoded signal received from the FSK-decoding portion 52, for reading an information signal modulated by the radio-frequency tag 14 (or the reference tag 16); an effective-communication-range determining portion 56 configured to determine an effective range of communication with the radio-frequency tag 14, by controlling a directivity control portion in the form of the transmission PAA weight control portion 34 and the reception PAA weight control portion 48 to change the directivity of communication of the radio-frequency tag communication device 12, to detect the positions of the reference tags 16; and a transmitted-signal-strength determining portion 58 configured to determine minimum strengths of the transmitted signals required to permit radio communication with the radio-frequency tag 14 and the reference tags 16. The reception memory portion 44 also stores results of the determinations made by the effective-communication-range determining portion 56 and the transmitted-signal-strength determining portion 58. Preferably, the reception memory portion 44 stores a plurality of results of the determinations which are made by the effective-communication-range determining portion 56 on the basis of the information received from the respective reference tags 16.

Figure 3:
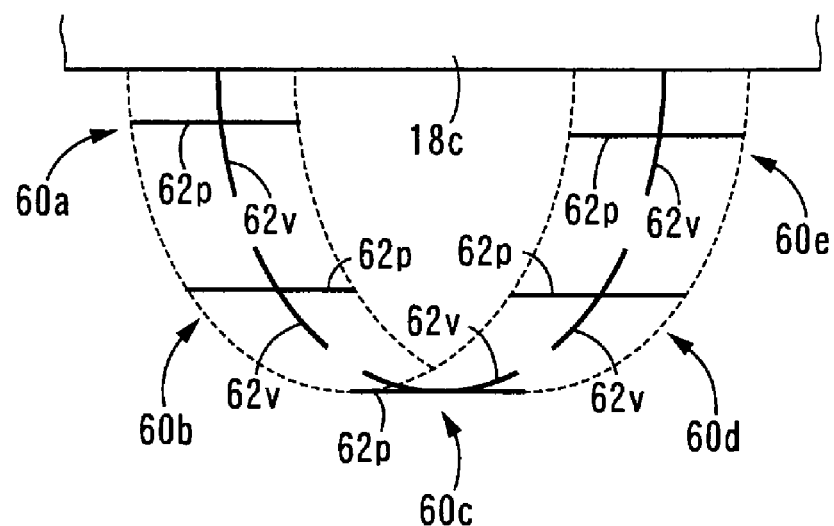
FIG. 3 is a schematic view illustrating an arrangement of array antenna devices provided in the radio-frequency tag communication device of FIG. 2.
Figure 4:
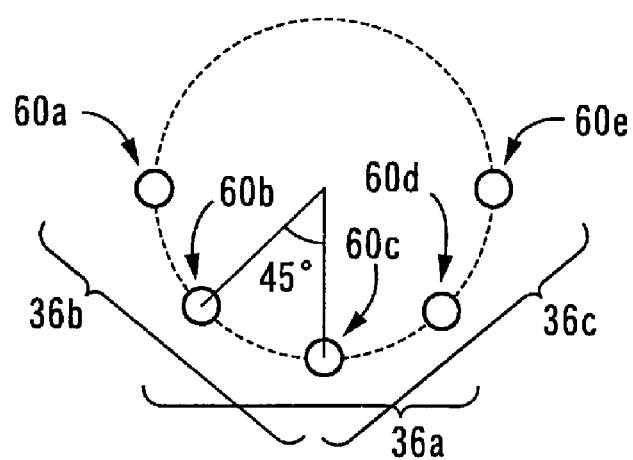
FIG. 4 is a front elevational view of the array antenna devices as viewed in an axial direction of rod-like antenna elements of the array antenna devices, which antenna elements are disposed in parallel to a ceiling of a room of FIG. 1.

FIG. 3 is a view schematically showing an arrangement of the array antenna devices 36, and FIG. 4 is a front elevational view of the array antenna devices 36 taken in the axial direction of rod-like antenna elements 60p of the array antenna devices 36, which are disposed in parallel to the ceiling 18c of the room 18. As shown in FIGS. 3 and 4, the array antenna devices 36 include a plurality of (five in the example of FIGS. 3 and 4) circular polarization antenna units 60a, 60b, 60c, 60d, 60d and 60f (hereinafter collectively referred to as "antenna units 60", unless otherwise specified) each of which consists of a first rod-like antenna element 62p disposed in parallel to the ceiling 18c and a second rod-like antenna element 62v which intersects the first rod-like antenna element 60p, so that the array antenna devices 36 can deal with different circularly polarized waves. As shown in FIG. 4, the first rod-like antenna elements 62p are arranged along a circle (indicated by broken line) such that the first rod-like antenna elements 62p are equally spaced apart from each other at an angular interval or pitch of 45°. The array antenna device 36a is constituted by the antenna units 60b, 60c and 60d, and the array antenna device 36b is constituted by the antenna units 60a, 60b and 60d, while the array antenna device 36c is constituted by the antenna units 60c, 60d and 60f. The antenna selector portion 42 connects the high-frequency transmitter/receiver portion 40a to the first rod-like antenna element 62p of a selected one of the antenna units 60a, 60b and 60c, and connects the high-frequency transmitter/receiver portion 40b to the second rod-like antenna element 62v of a selected one of the antenna units 60a, 60b and 60c. The antenna selector portion 42 further connects the high-frequency transmitter/receiver portion 40c to the first rod-like antenna element 62p of a selected one of the antenna units 60b, 60c and 60d, and connects the high-frequency transmitter/receiver portion 40d to the second rod-like antenna element 62v of a selected one of the antenna units 60b, 60c and 60d. The antenna selector portion 40 further connects the high-frequency transmitter/receiver antenna portion 40d to the first rod-like antenna element 62p of a selected one of the antenna units 60c, 60d and 60e, and connects the high-frequency transmitter/receiver antenna portion 40e to the second rod-like antenna element 62v of a selected one of the antenna units 60c, 60d and 60e.

Figure 5:
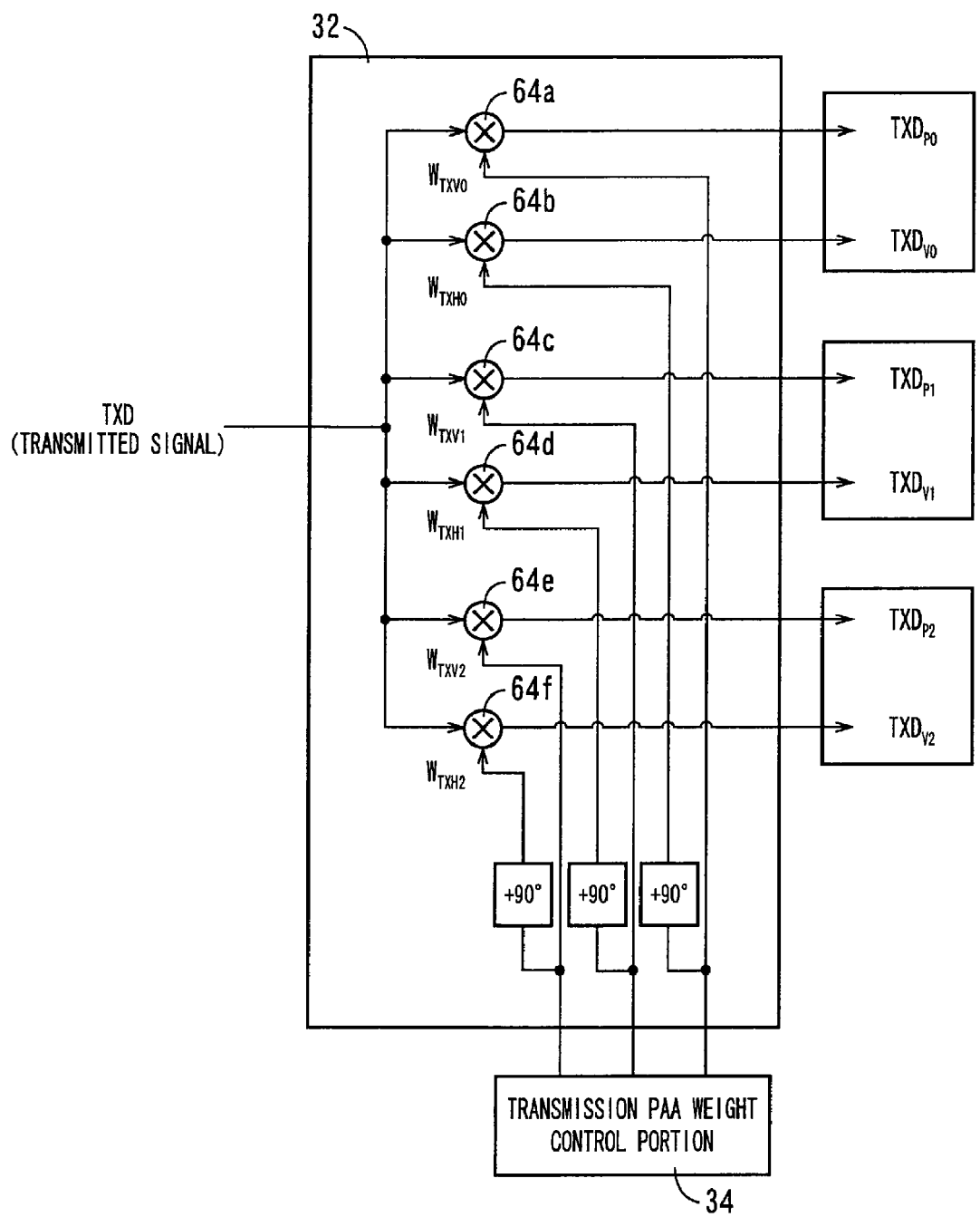
FIG. 5 is a block diagram showing in detail an arrangement of transmission weight multiplying portion of the radio-frequency tag communication device of FIG. 2.

Referring to FIG. 5, there will be described an arrangement of the transmission weight multiplying portion 32. As shown in FIG. 5, the transmission weight multiplying portion 32 includes a plurality of (six in the example of FIG. 6) multipliers 64a, 64b, 64c, 64d, 64e and 64f (hereinafter collectively referred to as "multipliers 64", unless otherwise specified) configured to multiply the respective six transmitted signals read out from the transmission memory portion 30, by the respective transmission PAA weights received from the transmission PAA weight control portion 34, and to apply the transmitted signals multiplied by the transmission PAA weights, to the high-frequency transmitter/receiver portions 40. The transmission PAA weights to be applied to the multipliers 64b, 64d and 64f have an adjacent phase difference of 90° corresponding to the first rod-like antenna elements 60p. The six multipliers 64a, 64b, 64c, 64d, 64e and 64f are connected to the respective six high-frequency transmitter/receiver portions 40a, 40b, 40c, 40d, 40e and 40f, so that the outputs of the six multipliers 64 are applied to the respective six high-frequency transmitter/receiver portions 40.

Figure 6:
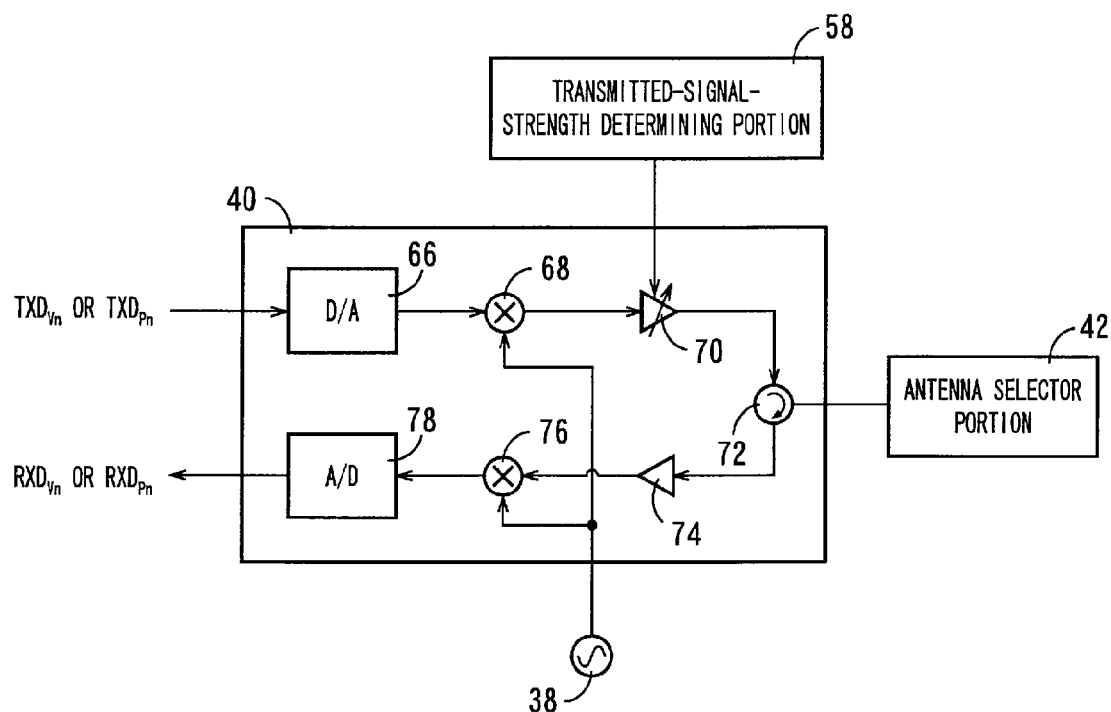
FIG. 6 is a block diagram showing in detail an arrangement of a high-frequency transmitter/receiver portion of the radio-frequency tag communication device of FIG. 2.

Referring next to FIG. 6, there will be described in detail an arrangement of each high-frequency transmitter/receiver portion 40. As shown in FIG. 6, each high-frequency transmitter/receiver portion 40 includes: a transmitted-signal D/A converter 66 configured to convert the transmitted signal received from the transmission weight multiplying portion 32, into an analog signal; an up converter 68 configured to increase the frequency of the analog transmitted signal received from the transmitted-signal D/A converter 66, by an amount equal to the frequency of the local signal received from the local-signal generating portion 38; a variable amplifier in the form of a transmitted-signal amplifier 70 configured to amplify the transmitted signal the frequency of which has been increased by the up converter 68; a directional coupler 72 configured to apply the transmitted signal received from the transmitted-signal amplifier 70 to the antenna selector portion 42, and to apply the received signal received from the antenna selector portion 42 to a received-signal amplifier 74; the received-signal amplifier 74 configured to amplify the received signal received from the directional coupler 72; a down converter 76 configured to reduce the frequency of the received signal received from the received-signal amplifier 74, by an amount equal to the frequency of the local signal received from the local-signal generating portion 38; and a received-signal A/D converter 78 configured to covert the received signal the frequency of which has been reduced by the down converter 76, into a digital signal, and to apply the digital signal to the reception memory portion 44. In this respect, it is noted that the transmitted-signal amplifier 70 functions as a transmission-output changing portion configured to change the strength of the transmitted signal according to a command received from the transmitted-signal-strength determining portion 58.

Figure 7:
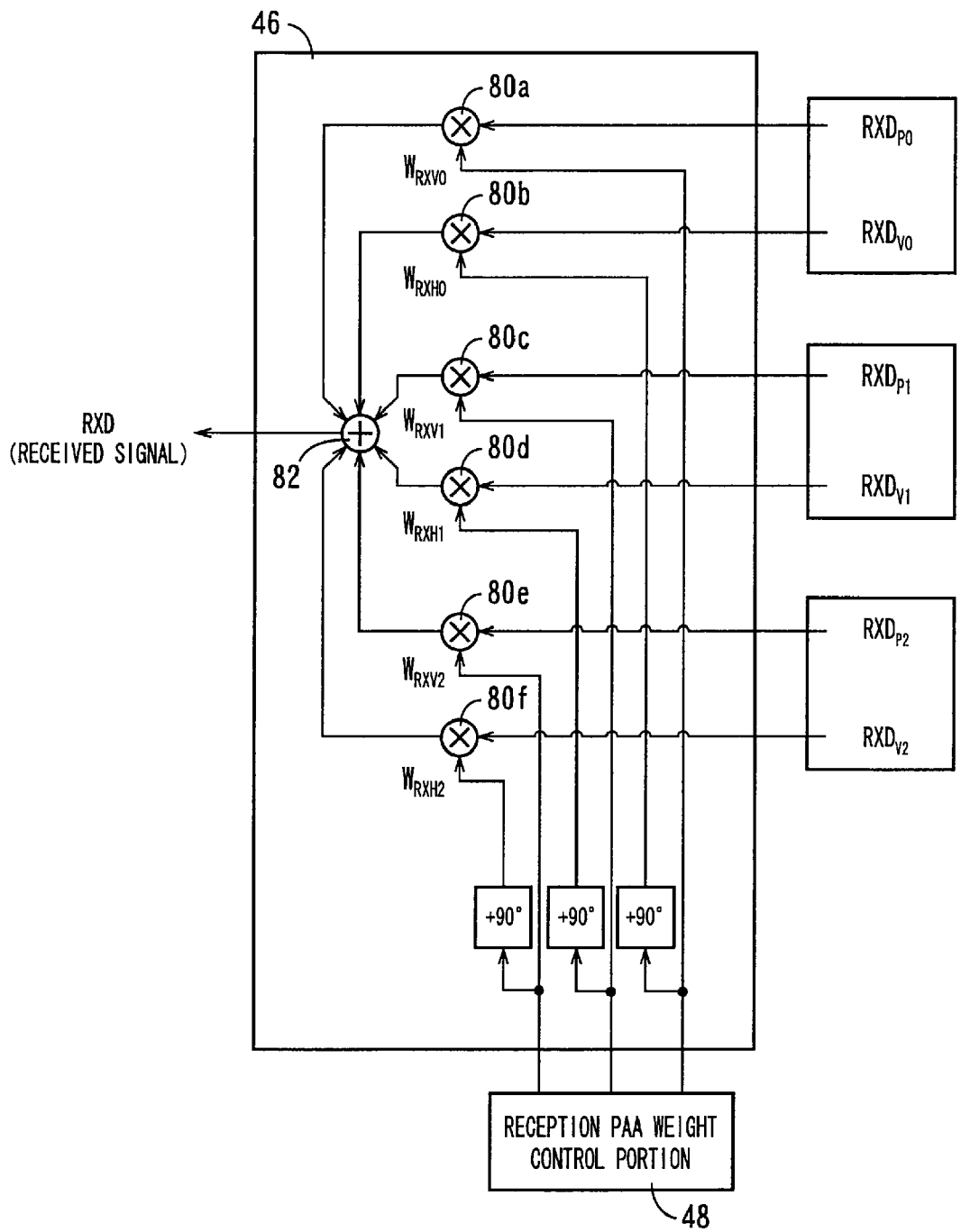
FIG. 7 is a block diagram showing in detail an arrangement of a reception weight multiplying portion of the radio-frequency tag communication device of FIG. 2.

Referring next to FIG. 7, there will be described in detail an arrangement of the reception weight multiplying portion 46. As shown in FIG. 7, the reception weight multiplying portion 46 includes: a plurality of (six in the example of FIG. 7) multipliers 80*a*, 80*b*, 80*c*, 80*d*, 80*e* and 80*f* (hereinafter collectively referred to as "multipliers 80", unless otherwise specified) configured to multiply the respective received signals read out from the reception memory portion 44, by the respective reception PAA weights; and a summer 80 configured to sum the output signals of the multipliers 80 and to apply a sum of the output signals to the AM-demodulating portion 50. The reception PAA weights to be applied to the multipliers 80*b*, 80*d* and 80*f* have an adjacent phase difference of 90° corresponding to the first rod-like antenna elements 60*p*. The multipliers 80*a*, 80*b*, 80*c*, 80*d*, 80*e* and 80*f* correspond to the respective high-frequency transmitter/receiver portions 40*a*, 40*b*, 40*c*, 40*d*, 40*e* and 40*f*.

Figure 8:
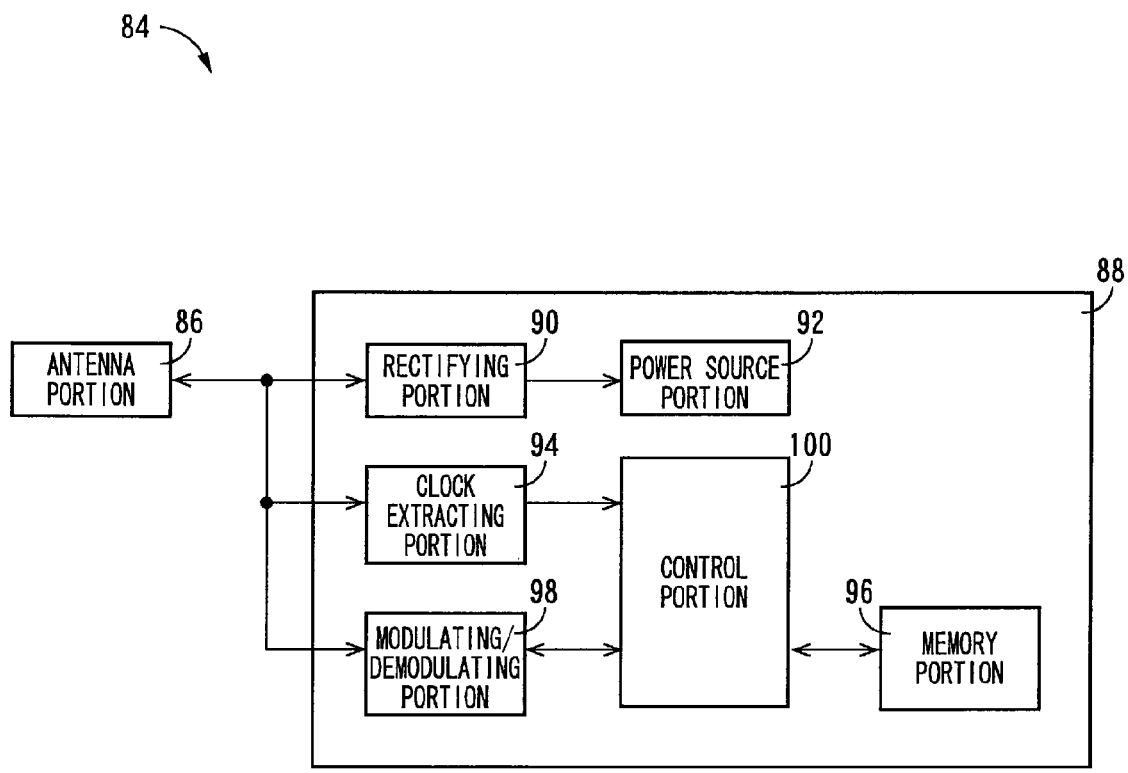
FIG. 8 is a view showing an arrangement of a circuit element of a communication object in the form of a radio-frequency tag for radio communication with the radio-frequency tag communication device of FIG. 2, and a reference tag.

FIG. 8 shows an arrangement of a circuit element 84 of the radio-frequency tag 14 and each reference tag 16. As shown in FIG. 8, the circuit element 84 consists of an antenna portion 86 for signal transmission and reception to and from the radio-frequency tag communication device 12, and an IC circuit portion 88 configured to process the signals received through the antenna portion 86. The IC circuit portion 88 has functional portions including: a rectifying portion 90 configured to rectify the interrogating wave $F_c$ received through the antenna portion 86; a power source portion 92 configured to store an electric energy of the interrogating wave $F_c$ rectified by the rectifying portion 90; a clock extracting portion 94 configured to extract a clock signal from the carrier wave received through the antenna portion 86, and to apply the extracted clock signal to a control portion 100; the above-indicated memory portion 96 functioning as a memory capable of storing desired information (such as the boundary condition information in the case of the reference tag 16); a modulating/demodulating portion 98 connected to the antenna portion 86 and configured to effect signal modulation and demodulation; and the above-indicated control portion 100 configured to control operations of the circuit element 84 through the above-indicated rectifying portion 90, clock extracting portion 94, modulating/demodulating portion 98, etc. The control portion 100 is configured to implement basic control operations such as an operation to store the desired information in the memory portion 96 by radio communication with the radio-frequency tag communication device 12, an operation to modulate the interrogating wave $F_c$ received through the antenna portion 86, on the basis of the information signal stored in the memory portion 96, and an operation to transmit the modulated wave as the reply signal $F_r$ from the antenna portion 86.

As indicated above, the transmission PAA weight control portion 34 and the reception PAA weight control portion 48 of the radio-frequency tag communication device 12 function the directivity control portion configured to control the directivity of communication of the radio-frequency tag communication device 12 with the radio-frequency tag 14 and the reference tags 16. Preferably, the directivity control portion 34, 48 is arranged to control the directivity of communication with the radio-frequency tag 14, on the basis of a result of a determination by the effective-communication-range determining portion 56 during radio communication of the radio-frequency tag communication device 12 with the reference tags 16. For instance, the directivity control portion 34, 48 is configured to change a main lobe direction θ (indicated in FIG. 1 by broken lines), that is, the direction of communication, for thereby detecting the positions of the reference tags 16*a*, 16*b*, and to determine, as the effective range of communication, an angular range defined by the detected positions of the reference tags 16*a*, 16*b*. In this directivity control by the directivity control portion 34, 48, the antenna selector portion 42 selects an appropriate one of the array antenna devices 36*a*, 36*b*, 36*c*, depending upon the presently established direction of communication (main lobe direction) θ, so that the radio communication with the radio-frequency tag 14 or reference tags 16 is effected through the selected array antenna 36. As described above, the two reference tags 16*a*.16*b* are located at the respective opposite parallel edges of the floor of the room 18, which define the effective range of communication of the radio-frequency communication device 12. In other words, the opposite edges of the floor define the opposite ends of a range of the direction of communication θ at which the respective two reference tags 16*a*, 16*b* are detected. The article 20 to which the radio-frequency tag 14 is attached is expected to be placed between the two reference tags 16*a*, 16*b* in the room 18. In this respect, the main lobe direction θ is changed only within the effective communication range determined by the effective-communication-range determining portion 56. Where the maximum directivity direction of the radio-frequency tag communication device 12 is controlled three dimensionally, four reference tags 16 are disposed fixedly at respective four corners or on respective four walls of the room 18. In this case, the radio-frequency tag communication device 12 is arranged to determine a three-dimensional effective range of communication, on the basis of a result of the communication with the four reference tags 16.

The transmitted-signal-strength determining portion 58 is configured to determine the minimum strengths of the transmitted signals required to permit radio communication with the reference tags 16. Described in detail, the transmitted-signal-strength determining portion 58 controls the amplification ratios of the transmitted-signal amplifiers 70 of the high-frequency transmitter/receiver portions 50 so as to minimize the strengths of the transmitted signals to an extent that permits sufficient wave detection by the AM-demodulating portion 50 (that permits decoding by the FSK-decoding portion 52). Since the reference tags 16 are fixedly disposed, the transmitted-signal-strength determining portion 58 is required to perform only one operation to determine the minimum strengths of the transmitted signals, which are preferably stored in the reception memory portion 44 for each of the reference tags 16. The transmitted-signal-strength determining portion 58 is further configured to determine the minimum strengths of the transmitted signals required to permit radio communication with the radio-frequency tag 14, in the same manner as described above with respect to the reference tags 16. The radio-frequency tag 14 is either moved with the article 20, or fixed at a predetermined position (on the floor or a given rack) in the room 18. In the latter case wherein the radio-frequency tag 14 is fixed at the predetermined position relative to the radio-frequency tag communication device 12), the transmitted-signal-strength determining portion 58 is required to perform only one operation to determine the minimum strengths of the transmitted signals for radio communication with the radio-frequency tag 14. In this case, too, the minimum strengths once determined by the transmitted-signal-strength determining portion 58 are preferably stored in the reception memory portion 44.

Referring to the flow chart of FIG. 9, there will be described a radio communication control routine executed by the radio-frequency communication device 12 for radio communication with the radio-frequency tag 14 and the reference tags 16. This radio communication control routine is repeatedly executed with a predetermined cycle time.

Figure 10:
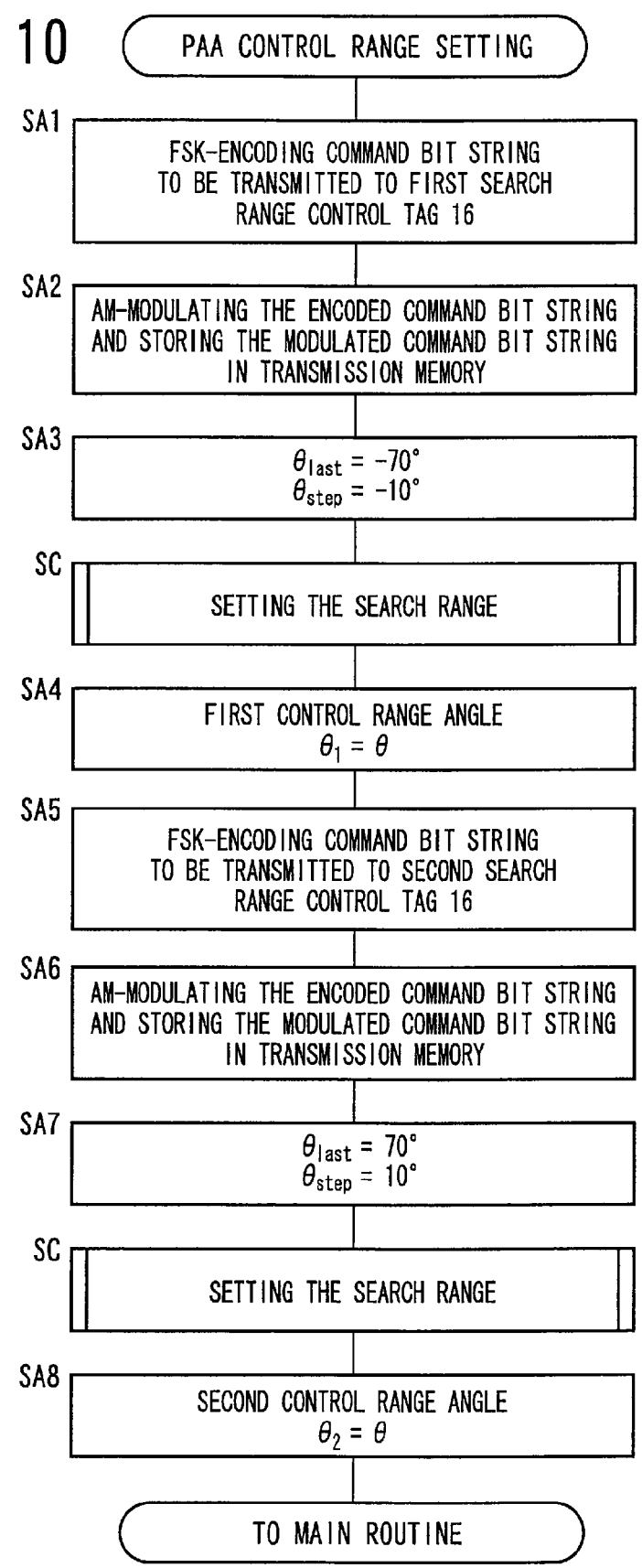
FIG. 10 is a flow chart illustrating a PAA control range setting routine implemented in step SA of the radio communication control routine of FIG. 9.
Figure 12:
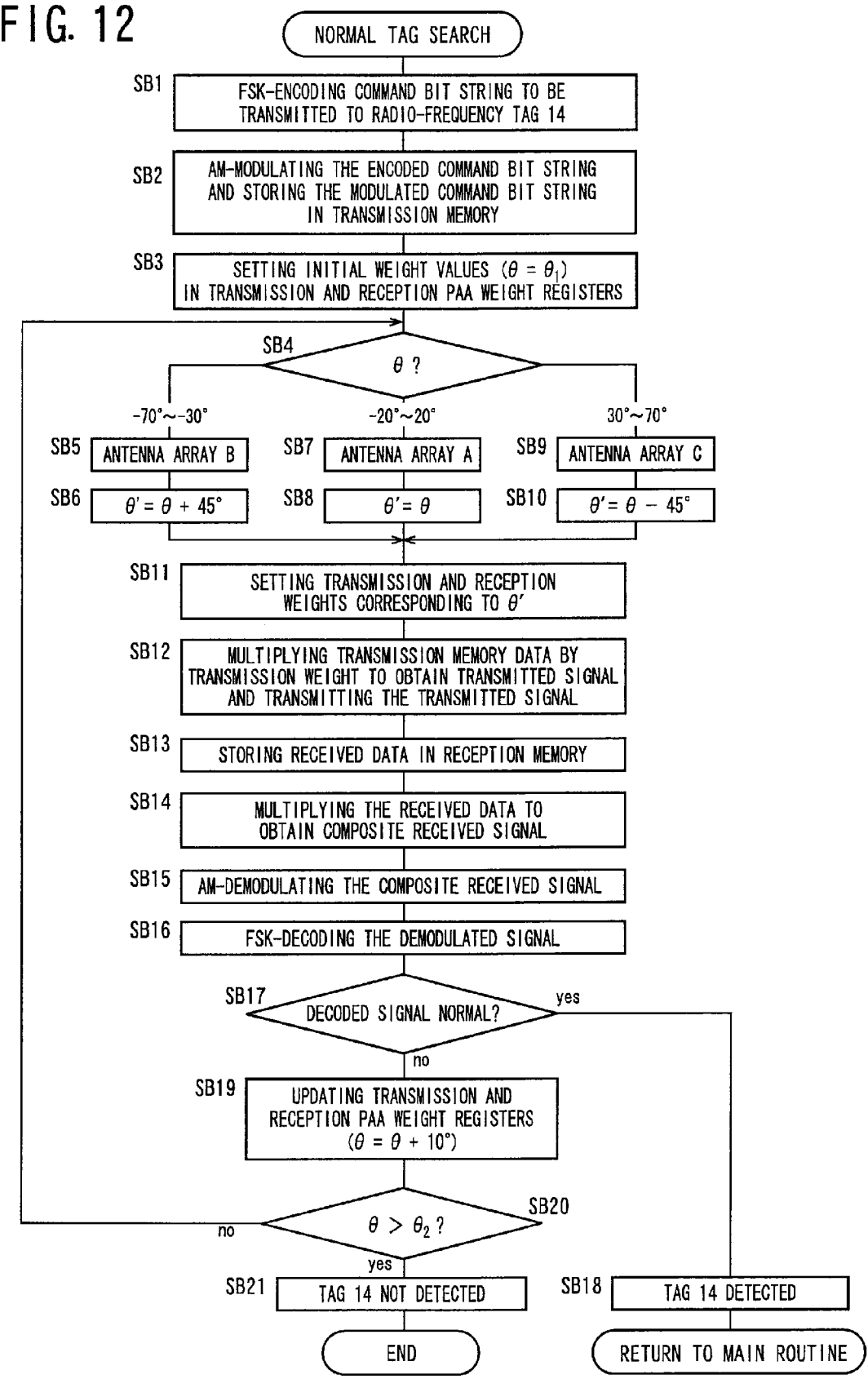
FIG. 12 is a flow chart illustrating a normal tag search routine implemented in step SB of the radio communication control routine of FIG. 9.

The radio communication control routine is initiated with step S1 to determine whether the radio-frequency tag communication device 12 is placed in a PAA (phased array antenna) control range setting mode for setting the effective range of communication with the radio-frequency tag 14. If an affirmative determination is made in step S1, the control flow goes to step SA corresponding to an operation of the effective-communication-range determining portion 56, in which a PAA control range setting routine illustrated in the flow chart of FIG. 10 is implemented. The present radio communication control routine is terminated after implementation of step SA. If a negative determination is obtained in step S1, the control flow goes to step SB in which a normal tag search routine illustrated in the flow chart of FIG. 12 is implemented. The present control routine is terminated after implementation of step SB.

Figure 9:
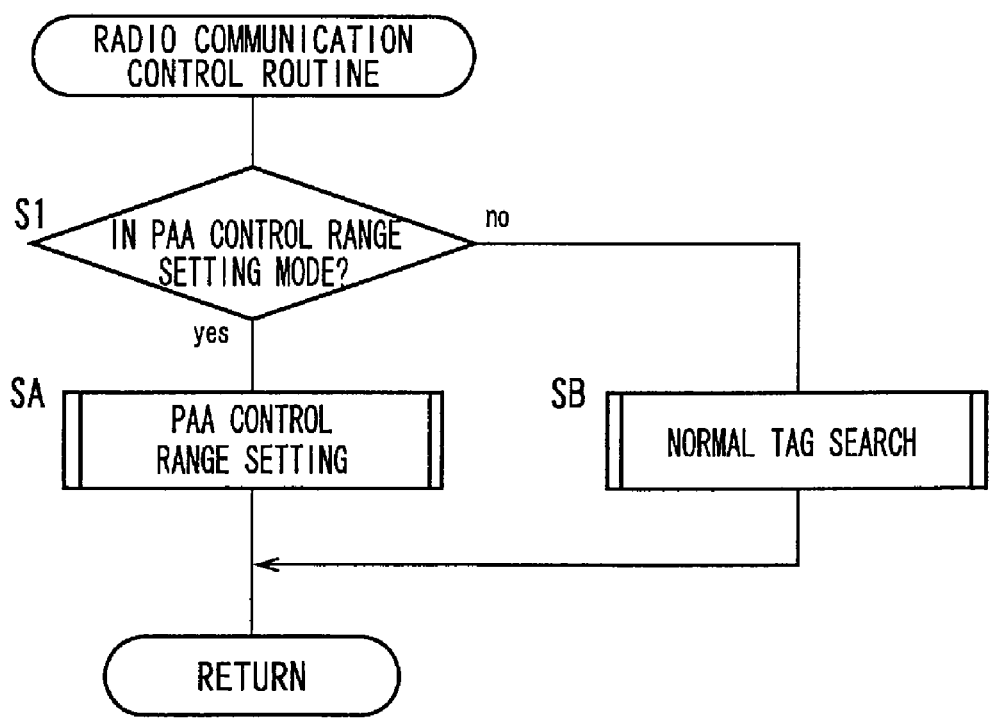
FIG. 9 is a flow chart illustrating a major part of a radio communication control routine executed by the radio-frequency tag communication device of FIG. 2.
Figure 11:
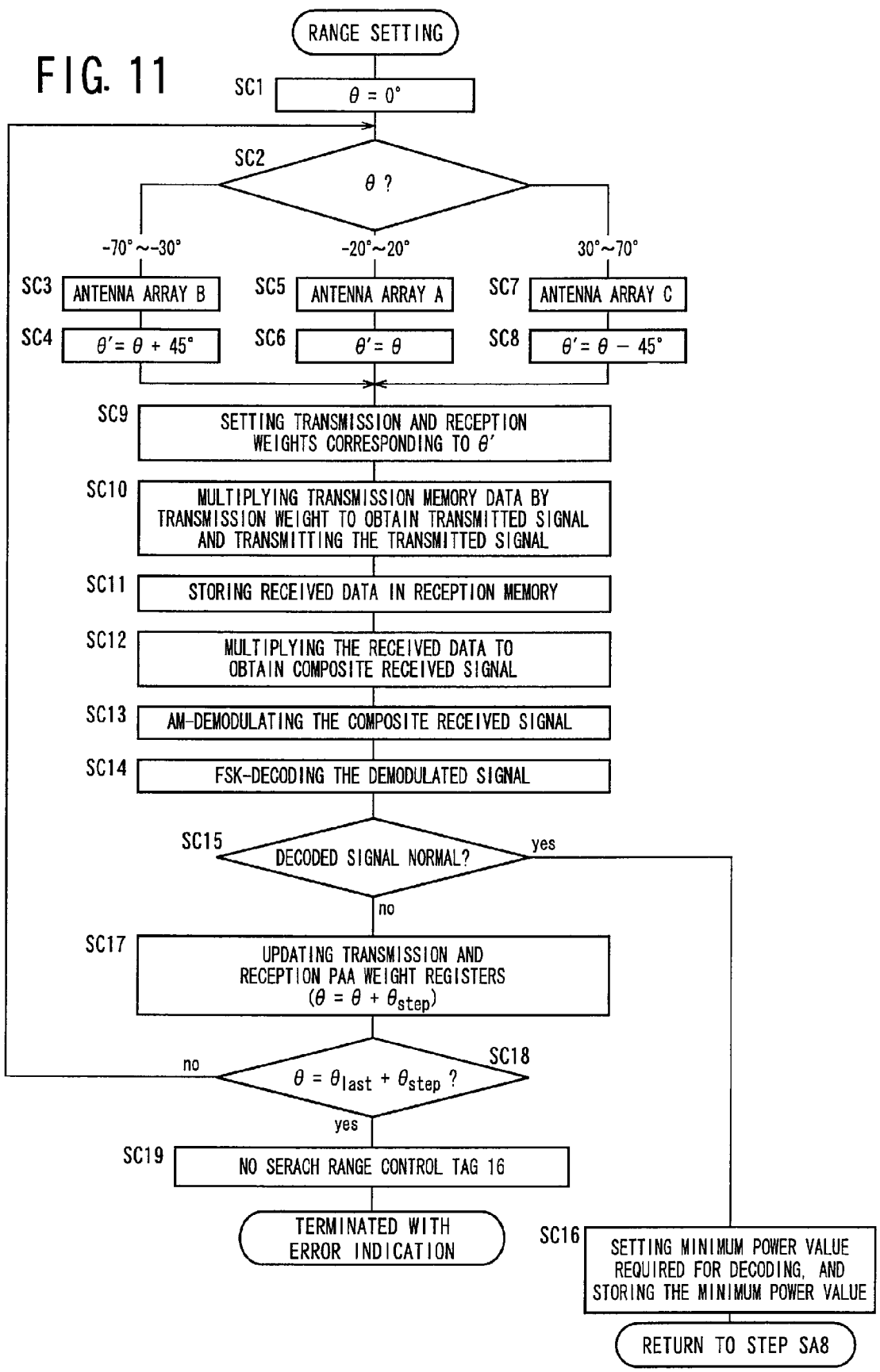
FIG. 11 is a flow chart illustrating a range setting operation implemented in step SC of the PAA control range setting routine of FIG. 10.

The above-described step SA of the flow chart of FIG. 9, that is, the PAA control range setting routine illustrated in the flow chart of FIG. 11 is initiated with step SA1 in which a string of command bits for radio communication with the reference tag 16 for controlling a first search range is generated by the command-bit-string generating portion 24, and is FSK-encoded by the FSK-encoding portion 26. Then, the control flow goes to step SA2 in which the encoded command bit string is AM-modulated by the AM-modulating portion 28, and the AM-modulated signal is stored in the transmission memory portion 30. The control flow then goes to SA3 in which an initial value of an angle $\theta_{last}$ and an initial value of an angle $\theta_{step}$ are set to $-70°$ and $-10°$, respectively. Then, the control flow goes to step SC in which a range setting operation illustrated in the flow chart of FIG. 11 is implemented for the first search range. The control flow then goes to step SA4 in which a first control range angle $\theta_1$ is set to be equal to the angle $\theta$ obtained in step SC. Then, the control flow goes to step SA5 in which a string of command bits for radio communication with the reference tag 16 for controlling a second search range is generated by the command-bit-string generating portion 24, and is FSK-encoded by the FSK-encoding portion 26. Then, the control flow goes to step SA6 in which the encoded command bit string is AM-modulated by the AM-modulating portion 28, and the AM-modulated signal is stored in the transmission memory portion 30. The control flow then goes to SA7 in which an initial value of the angle $\theta_{last}$ and the initial value of the angle $\theta_{step}$ are set to $70°$ and $10°$, respectively. Then, the control flow goes to the step SC in which the range setting operation illustrated in the flow chart of FIG. 11 is implemented for the second search range. The control flow then goes to step SA8 in which a second control range angle $\theta_2$ is set to be equal to the angle $\theta$ obtained in step SC. Then, the control flow returns to the main routine of FIG. 9.

The above-indicated step SC of the flow chart of FIG. 10, that is, the range setting operation illustrated in the flow chart of FIG. 11 is initiated with step SC1 in which the initial value of the angle $\theta$ is set to $0°$. Then, the control flow goes to step SC2 to determine one of a first angular range between $-70°$ and $-30°$, a second angular range between $-20°$ and $20°$ and a third angular range between $30°$ and $70°$ in which the angle $\theta$ falls. If it is determined in step SC2 that the angle $\theta$ falls in the first angular range, the control flow goes to step SC3 in which the antenna selector portion 42 selects the array antenna device 36b, and to step SC4 in which an angle $\theta'$ to be actually set is set to $\theta+45°$ in the weight registers of the transmission PAA weight control portion 34 and the reception PAA weight control portion 48. Step SC6 is followed by step SC9 and the subsequent steps. If it is determined in step SC2 that the angle $\theta$ falls in the second angular range, the control flow goes to step SC5 in which the antenna selector portion 42 selects the array antenna device 36a, and to step SC6 in which the angle $\theta'$ is set to $\theta$ in the weight registers. Step SC6 is followed by step SC9 and the subsequent steps. If it is determined in step SC2 that the angle $\theta$ falls in the third angular range, the control flow goes to step SC7 in which the antenna selector portion 42 selects the array antenna device 36c, and to step SC8 in which the angle $\theta'$ is set to $\theta-45°$ in the weight registers. Step SC8 is followed by step SC9 and the subsequent steps.

In step SC9, the transmission and reception weights corresponding to the angle $\theta'$ set in step SC4, SC6 or SC8 are set in the weight registers of the transmission PAA weight control portion 34 and the reception PAA weight control portion 48. Then, the control flow goes to step SC10 in which the transmitted signal stored in the transmission memory portion 30 is read out, multiplied by the transmission PAA weight set in step SC9, by the transmission weight multiplying portion 32, applied to the high-frequency transmitter/receiver portion 40 and transmitted from the array antenna device 36 selected in step SC3, SC5 or SC7. The control flow then goes to step SC11 in which the reply signals transmitted from the reference tags 16 in response to the transmitted signal transmitted in step SC10 are received and stored into the reception memory portion 44 through the high-frequency transmitter/receiver portions 40. Then, the control flow goes to step SC12 in which the received signals are read out from the reception memory portion 44, multiplied by the reception PAA weight set in step SC9, by the reception weight multiplying portion 46, and combined together to obtain a composite received signal. The control flow then goes to step SC13 in which the composite signal obtained in step SC12 is AM-demodulated by the AM-demodulating portion 50. Then, the control flow goes to sep SC14 in which the demodulated signal obtained in step SC13 is FSK-decoded by the FSK-decoding portion 52.

Then, the control flow goes to step SC15 to determine whether the decoded signal obtained in step SC14 is normal or not. If an affirmative determination is obtained in step SC15, the control flow goes to step SC16 corresponding to the transmitted-signal-strength determining portion 58, to calculate an amount of electric power required to transmit the transmitted signal having the minimum strength required to permit the decoding of the demodulated signal by the FSK-decoding portion 52. The calculated amount of electric power is stored in the reception memory portion 44. Then, the control flow goes back to the PAA control range setting routine of FIG. 10. If a negative determination is obtained in step SC15, the control flow goes to step SC17 in which the angle θ is incremented by $θ_{step}$, to update the transmission and reception weights in the weight registers of the transmission PAA weight control portion 34 and the reception PAA weight control portion 48. The control flow then goes to step SC18 to determine whether the angle θ is equal to $θ_{last}+θ_{step}$. If a negative determination is obtained in step SC18, the control flow goes back to step SC2 and the subsequent steps. If an affirmative determination is obtained in step SC18, the control flow goes to step SC19 to determine that the reference tags 16 serving as search range control tags are not present. In this case, the present range setting operation of FIG. 11 is terminated with an indication of an error.

The step SB of the flow chart of FIG. 9, that is, the normal tag search control illustrated in the flow chart of FIG. 12 is initiated with step SB1 in which a string of command bits for radio communication with the communication object in the form of the radio-frequency tag 24 is generated by the command-bit-string generating portion 24, and FSK-encoded by the FSK-encoding portion 26. Then, the control flow goes to step SB2 in which the command bit string encoded in step SB1 is AM-modulated by the AM-modulating portion 28, and the modulated command bit string is stored in the transmission memory portion 30. The control flow then goes to step SB3 in which the initial weight values are set in the weight registers of the transmission PAA weight control portion 34 and the reception PAA weight control portion 48, with the angle θ indicative of the direction of maximum directivity being set as the first control range angle $θ_1$. Then, the control flow goes to step SB4 to determine one of the first angular range between −70° and −30°, second angular range between −20° and 20° and third angular range between 30° and 70° in which the angle θ falls. If it is determined in step SB42 that the angle θ falls in the first angular range, the control flow goes to step SC5 in which the antenna selector portion 42 selects the array antenna device 36b, and to step SB6 in which the angle θ' to be actually set is set to θ+45° in the weight registers of the transmission PAA weight control portion 34 and the reception PAA weight control portion 48. Step SB6 is followed by step SB11 and the subsequent steps. If it is determined in step SB4 that the angle θ falls in the second angular range, the control flow goes to step SB7 in which the antenna selector portion 42 selects the array antenna device 36a, and to step SB8 in which the angle θ' is set to θ in the weight registers. Step SB8 is followed by step SB11 and the subsequent steps. If it is determined in step SB4 that the angle θ falls in the third angular range, the control flow goes to step SB9 in which the antenna selector portion 42 selects the array antenna device 36c, and to step SB10 in which the angle θ' is set to θ−45° in the weight registers. Step SB10 is followed by step SB11 and the subsequent steps.

In step SB11, the transmission and reception weights corresponding to the angle θ' set in step SB6, SB8 or SB10 are set in the weight registers of the transmission PAA weight control portion 34 and the reception PAA weight control portion 48. Then, the control flow goes to step SB12 in which the transmitted signal stored in the transmission memory portion 30 is read out, multiplied by the transmission PAA weight set in step SB11, by the transmission weight multiplying portion 32, applied to the high-frequency transmitter/receiver portion 40 and transmitted from the array antenna device 36 selected in step SB5, SB7 or SB9. The control flow then goes to step SB13 in which the reply signal transmitted from the radio-frequency tag 14 in response to the transmitted signal transmitted in step SB12 is received and stored into the reception memory portion 44 through the high-frequency transmitter/receiver portions 40. Then, the control flow goes to step SB14 in which the received signals are read out from the reception memory portion 44, multiplied by the reception PAA weight set in step SB11, by the reception weight multiplying portion 46, and combined together to obtain a composite received signal. The control flow then goes to step SB15 in which the composite signal obtained in step SB14 is AM-demodulated by the AM-demodulating portion 50. Then, the control flow goes to sep SB16 in which the demodulated signal obtained in step SB15 is FSK-decoded by the FSK-decoding portion 52.

Then, the control flow goes to step SB17 to determine whether the decoded signal obtained in step SB16 is normal or not. If an affirmative determination is obtained in step SB17, the control flow goes to step SB18 to detect the radio-frequency tag 14 and read the information from the radio-frequency tag 14. The control flow then goes back to the radio communication control routine of FIG. 9. If a negative determination is obtained in step SB17, the control flow goes to step SB19 in which the angle θ is incremented by 10°, to update the transmission and reception weights in the weight registers of the transmission PAA weight control portion 34 and the reception PAA weight control portion 48. The control flow then goes to step SB20 to determine whether the angle θ is larger than the second control range angle $θ_2$. If a negative determination is obtained in step SB20, the control flow goes back to step SB4 and the subsequent steps. If an affirmative determination is obtained in step SB20, the control flow goes to step SB21 to determine that the radio-frequency tag 14 is not present within the effective range of communication. In this case, the present normal tag search control of FIG. 12 is terminated. It will be understood that steps SB3, SB11, SB19, SC9, SC17, etc. correspond to the operations of the transmission PAA weight control portion 34 and the reception PAA weight control portion 48.

In the radio-frequency tag communication system constructed according to the first embodiment described above, the reference tags 16 configured to transmit the reply signal in response to the transmitted signal for thereby effecting the radio communication with the radio-frequency tag communication device 12 are disposed fixedly in the room 18 which is the area of communication of the radio-frequency tag communication system 10, and the radio-frequency tag communication device 12 includes the directivity control portion in the form of the transmission PAA weight control portion 34 and the reception PAA weight control portion 48 (steps SB3, SB11, SB19, SC9 and SC17) configured to control the directivity of communication with the radio-frequency tag 14 on the basis of the result of the radio communication of the radio-frequency tag communication device 12 with the reference tags 16. Accordingly, the control range of directivity of communication of the radio-frequency tag communication device 12 can be set by effecting the radio communication with the reference tags 16 located at the predetermined positions. Thus, the present embodiment provides the radio-frequency tag communication system 10 wherein the radio-frequency tag communication device 12 is capable of adequately setting its control range of directivity of communication.

The present embodiment is further arranged such that the radio-frequency tag communication device 12 further includes the effective-communication-range determining portion 56 (step SA) configured to determine the effective range of communication of the radio-frequency tag communication device 12 with the radio-frequency tag 14, by detecting the positions of the reference tags 16 while the directivity of communication is changed by the transmission PAA weight control portion 34 and the reception PAA weight control portion 48, and these PAA weight control portions 34, 48 control the directivity of communication with the radio-frequency tag 14 on the basis of the result of determination by the effective-communication-range determining portion 56. Accordingly, it is possible to determine a plurality of effective and ineffective ranges of communication relating to the directivity of communication, thereby permitting more adequate setting of the control range of directivity of communication.

The present embodiment is further arranged such that the plurality of reference tags 16 are disposed fixedly at the respective edges defining the effective range of communication, and the effective-communication-range determining portion 56 determines a range between the plurality of reference tags, as the effective range of communication. Accordingly, the control range of directivity of communication can be effectively controlled.

The present embodiment is further arranged such that each reference tag 16 has the memory portion 96 which stores the boundary condition information indicative of the condition for determining the effective range of communication. Accordingly, the control range of directivity of communication can be effectively controlled by reading out the boundary condition information from the memory portion 96 of each reference tag 16.

The present embodiment is further arranged such that the radio-frequency tag communication device 12 further includes the transmitted-signal-strength determining portion 58 (step SC16) configured to determine the minimum strength of the transmitted signal, which minimum strength permits the radio communication of the radio-frequency tag communication device 12 with the reference tags 16. Accordingly, the amount of electric power required for the radio communication with the reference tags can be minimized.

In one advantageous arrangement of the second preferred form of the invention, the transmitted-signal-strength determining portion 58 is configured to determine the minimum strength of the transmitted signal, which minimum strength permits the radio communication of the radio-frequency tag communication device 12 with the radio-frequency tag 14. Accordingly, the amount of electric power required for the radio communication with the radio-frequency tag 14 can be minimized.

The present embodiment is further arranged such that the radio-frequency tag communication device 12 further includes the transmission-output changing portion in the form of the transmitted-signal amplifier 70 configured to change the strength of the transmitted signal, and the transmitted-signal-strength determining portion 58 commands the transmitted-signal amplifier 70 to control the strength of the transmitted signal to be transmitted toward the radio-frequency tag 14 and the reference tags 16. Accordingly, the amount of electric power required for the radio communication with the radio-frequency tag 14 and the reference tags can be suitably controlled.

The present embodiment is further arranged such that the radio-frequency tag communication device 12 further includes the reception memory portion 44 for storing the result of the radio communication with the reference tags 16. Accordingly, the control range of directivity of communication can be suitably set by reading out from the reception memory portion 44 the result of the radio communication which is effected a required number of times with the reference tags 16.

The present embodiment is further arranged such that the reception memory portion 44 is configured to store the result of determination by the effective-communication-range determining portion 56. Accordingly, the control range of directivity of communication can be suitably set by reading out from the memory portion the result of the radio communication (the result of the determination by the effective-communication-range determining portion 56) which is effected a required number of times with the at least one reference tag.

The present embodiment is further arranged such that the reception memory portion is configured to store the results of determinations which are made by the effective-communication-range determining portion 56 on the basis of information received from the respective reference tags 16. Where a plurality of areas of the effective range of communication are determined on the basis of the information received from the reference tags 16, the results of the determinations made by the effective-communication-range determining portion 56 are stored in the reception memory portion 44. In this case, the control range of directivity of communication can be suitably set by reading out from the reception memory portion 44 the results of the determinations by the effective-communication-range determining portion 56, each of which is effected a required number of times with the corresponding reference tag 16.

The present embodiment is further arranged such that the reception memory portion 44 stores a result of determination by the transmitted-signal-strength determining portion 58. Accordingly, the amount of electric power required for the present radio communication with the radio-frequency tag 14 and the reference tags 16 can be minimized by reading out from the reception memory portion 44 the result of the past determination by the transmitted-signal-strength determining portion 58.

The present embodiment is further arranged such that the radio-frequency tag communication device 12 further includes the array antenna devices 36 each having the plurality of rod-like antenna elements 62. Accordingly, the directivity of communication of the radio-frequency tag communication device 12 with the reference tags 16 and the radio-frequency tag 14 can be effectively controlled.

The present embodiment is further arranged such that each array antenna device 36 has the plurality of circular polarization antenna units 60 each of which consists of the two mutually intersecting rod-like antenna elements 62p, 62v. Accordingly, the radio-frequency tag communication device 12 can effect radio communication with the reference tags 15 and the radio-frequency tag 14, with high stability of sensitivity, by using different circularly polarized waves, irrespective of the relative position between the array antenna device 36 and the radio-frequency and reference tags 14, 16.

While the first embodiment of the radio-frequency tag communication device has been described above in detail by reference to FIGS. 1-12, it is to be understood that the present invention may be otherwise embodied.

Figure 13:
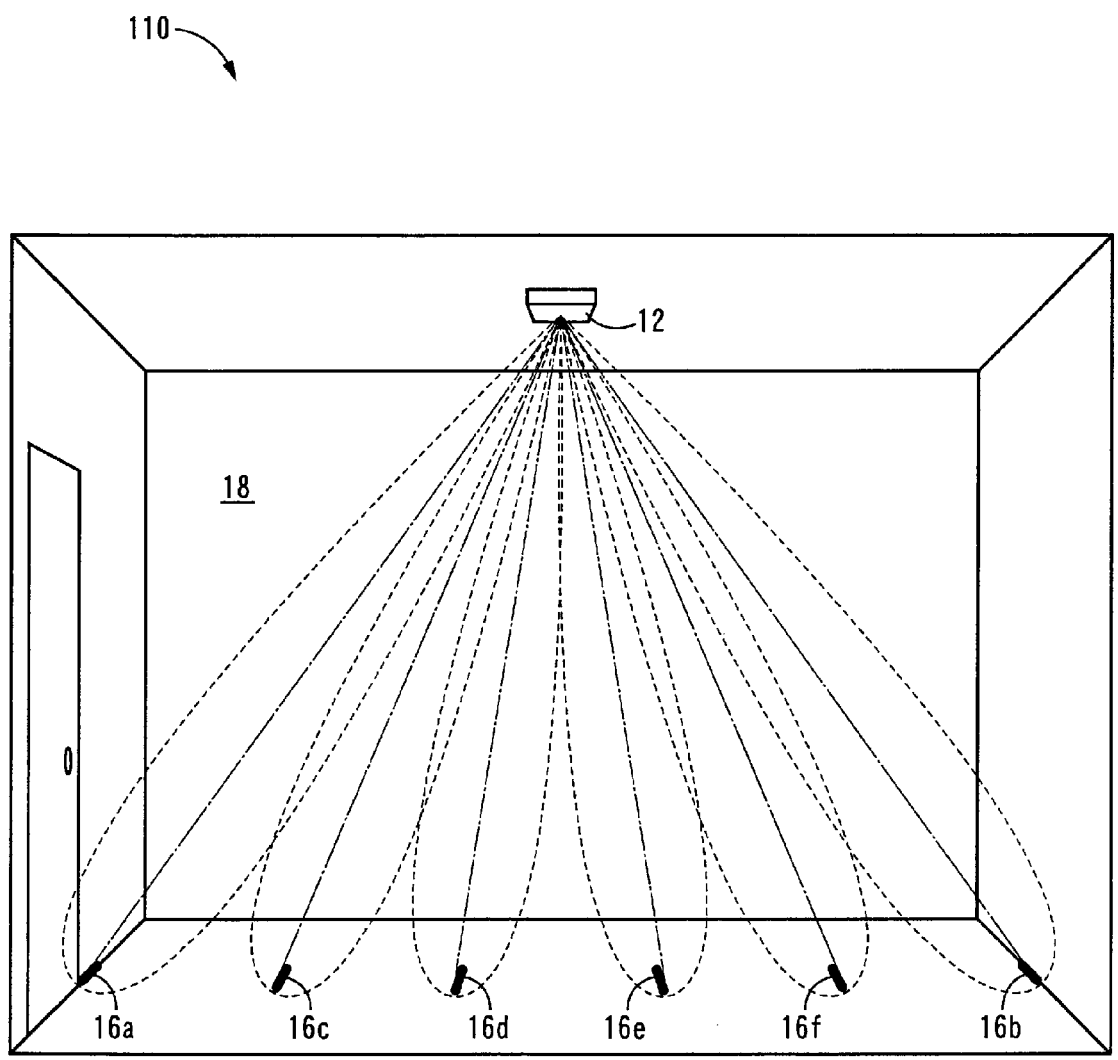
FIG. 13 is a view showing a radio-frequency tag communication system according to a second embodiment of this invention, wherein the number of reference tags is increased with respect to that in the first embodiment of FIG. 1.

Referring to FIG. 13, there is illustrated a radio-frequency tag communication system 10 constructed according to a second embodiment of this invention. This radio-frequency tag communication system 10 includes not only the two reference tags 16a, 16b provided in the first embodiment, but also four additional reference tags 16c, 16d, 16e and 16f which are disposed fixedly on the floor of the room 18, between the two reference tags 16a, 16b. In this second embodiment, the effective range of communication of the radio-frequency tag communication device 12 with the radio-frequency tag 14 consists of five areas, that is, a first area defined by the positions of the reference tags 16a, 16c, a second area defined by the positions of the reference tags 16c, 16d, a third area defined by the positions of the reference tags 16d, 16e, a fourth area defined by the positions of the reference tags 16e, 16f, and a fifth area defined by the positions of the reference tags 16f, 16b. Where a pillar exists between the reference tags 16c and 16d, or between the reference tags 16e and 16f, for example, the article 20 cannot be located between those two reference tags 16. Where only two reference tags 16a and 16b are provided in the room 18 in which the pillar exists, it takes a relatively long time and a relatively large amount of electric power to determine the effective range of communication. In the second embodiment using the six reference tags 16a-16f which define the five areas of the effective range of communication, the five areas can be determined on the basis of the information received from the six reference tags 16a-16f, so that the amount of electric power required for radio communication with the radio-frequency tag 14 can be minimized.

In the illustrated embodiments, the transmission PAA weight control portion 34, reception PAA weight control portion 48, effective-communication-range determining portion 56, transmitted-signal-strength determining portion 58, etc. of the radio-frequency tag communication device 12 are discrete control devices. However, those portions 34, 48, 56, 58, etc. may be functional portions of a single control device such as a DSP (digital signal processor. Those control devices or functional portions may be configured to perform either digital or analog signal processing operations.

In the illustrated embodiments described above, the directivity of transmission of the radio-frequency tag communication device 12 is controlled by the transmission PAA weight control portion 34, while the directivity of reception is controlled by the reception PAA control portion 48. However, only one of the directivity of transmission and the directivity of reception may be controlled. The principle of the present invention is applicable to this modification.

In the illustrated embodiment, the radio-frequency tag communication device 12 is arranged to control the directivity of communication with the radio-frequency tag 14 by the transmission PAA weight control portion 34 and the reception PAA weight control portion 48. However, the radio-frequency tag communication device 12 may use an antenna unit which can be mechanically oriented to control its direction of maximum directivity of communication. Further, the radio-frequency tag communication device 12 may use any type of antenna device other than the circular polarization array antenna device, provided the antenna device to be used permits radio communication with the radio-frequency tag 14 and the reference tags 16.

In the illustrated embodiments, the reception memory portion 44 is used to store the result of determination by the effective-communication-range determining portion 56 and the result of determination by the transmitted-signal-strength determining portion 58. However, the transmission memory portion 30 may be used to store the result of determination by the transmitted-signal-strength determining portion 58, for example. Further, the radio-frequency tag communication device 12 may include a memory portion for storing the results of determinations by the effective-communication-range determining portion 56 and the transmitted-signal-strength determining portion 58, in addition to the reception memory portion 44 and the transmission memory portion 30, It is to be understood that the present invention may be embodied with various other changes which may occur to those skilled in the art, without departing from the spirit and scope of this invention.

What is claimed is:

1. A radio-frequency tag communication system comprising:
   a radio-frequency tag;
   a radio-frequency tag communication device configured to transmit a transmitted signal toward the radio-frequency tag, and to receive a reply signal transmitted from the radio-frequency tag in response to said transmitted signal, for thereby effecting radio communication with said radio-frequency tag; and
   at least one reference tag disposed fixedly in an area of communication of the radio-frequency tag communication system and configured to transmit a reply signal in response to said transmitted signal, for thereby effecting radio communication with said radio-frequency tag communication device,
   wherein said radio-frequency tag communication device includes a directivity control portion configured to control a directivity of communication with said radio-frequency tag, on the basis of a result of the radio communication of the radio-frequency tag communication device with said at least one reference tag,
   wherein said radio-frequency tag communication device further includes an effective-communication-range determining portion configured to determine an effective range of communication of the radio-frequency tag communication device with said radio-frequency tag, by detecting a position of each of said at least one reference tag while the directivity of communication is changed by said directivity control portion, and said directivity control portion controls the directivity of communication with said radio-frequency tag on the basis of a result of determination by said effective-communication-range determining portion, and
   wherein said radio-frequency tag communication device determines said effective range of communication, such that the position of said radio-frequency tag determined by said effective-communication-range determining portion forms a boundary condition of said radio-frequency tag.

2. The radio-frequency tag communication system according to claim 1, wherein said at least one reference tag consists of a plurality of reference tags disposed fixedly at respective edges defining said effective range of communication, and said effective-communication-range determining portion determines a range between said plurality of reference tags, as said effective range of communication.

3. The radio-frequency tag communication system according to claim 1, wherein the boundary condition of said effective range of communication is stored in each of said at least one reference tag as boundary condition information.

4. The radio-frequency tag communication system according to claim 1, wherein said radio-frequency tag communication device further includes a transmitted-signal-strength determining portion configured to determine a minimum strength of said transmitted signal, which minimum strength permits the radio communication of the radio-frequency tag communication device with said at least one reference tag.

5. The radio-frequency tag communication system according to claim 4, wherein said transmitted-signal-strength determining portion is configured to determine a minimum strength of said transmitted signal, which minimum strength permits the radio communication of the radio-frequency tag communication device with said radio-frequency tag.

6. The radio-frequency tag communication system according to claim 4, wherein said radio-frequency tag communication device further includes a transmission-output changing portion configured to change the strength of said transmitted signal, and said transmitted-signal-strength determining portion commands said transmission-output changing portion to control the strength of the transmitted signal to be transmitted toward said radio-frequency tag and said at least one reference tag.

7. The radio-frequency tag communication system according to claim 1, wherein said radio-frequency tag communication device further includes a memory portion for storing a result of the radio communication with said at least one reference tag.

8. The radio-frequency tag communication system according to claim 7, wherein said radio-frequency tag communication device further includes an effective-communication-range determining portion configured to determine an effective range of communication of the radio-frequency tag communication device with said radio-frequency tag, by detecting a position of each of said at least one reference tag while the directivity of communication is changed by said directivity control portion, and said directivity control portion controls the directivity of communication with said radio-frequency tag on the basis of a result of a determination by said effective-communication-range determining portion, said memory portion being configured to store the result of determination by said effective-communication-range determining portion.

9. The radio-frequency tag communication system according to claim 8, wherein said at least one reference tag consists of a plurality of reference tags, and said memory portion is configured to store a plurality of results of determinations which are made by said effective-communication-range determining portion on the basis of information received from the respective reference tags.

10. The radio-frequency tag communication system according to claim 7, wherein said radio-frequency tag communication device further includes a transmitted-signal-strength determining portion configured to determine a minimum strength of said transmitted signal, which minimum strength permits the radio communication of the radio-frequency tag communication device with said at least one reference tag, and said memory portion is configured to store a result of determination by said transmitted-signal-strength determining portion.

11. The radio-frequency tag communication system according to claim 10, wherein said radio-frequency tag communication device further includes an array antenna device having a plurality of antenna elements.

12. The radio-frequency tag communication system according to claim 11, wherein said array antenna device has a plurality of circular polarization antenna units each of which consists of a pair of mutually intersecting rod-like antenna elements.

\* \* \* \* \*